(12) United States Patent
Yamagishi

(10) Patent No.: US 8,414,057 B2
(45) Date of Patent: Apr. 9, 2013

(54) STRUCTURE FOR FRONT SECTION OF VEHICLE BODY

(75) Inventor: Hideaki Yamagishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/498,794

(22) PCT Filed: Aug. 27, 2010

(86) PCT No.: PCT/JP2010/064595
§ 371 (c)(1),
(2), (4) Date: Mar. 28, 2012

(87) PCT Pub. No.: WO2011/043134
PCT Pub. Date: Apr. 14, 2011

(65) Prior Publication Data
US 2012/0187711 A1    Jul. 26, 2012

(30) Foreign Application Priority Data

Oct. 9, 2009  (JP) ................................. 2009-235530

(51) Int. Cl.
*B62D 25/14* (2006.01)
(52) U.S. Cl.
USPC ........................... 296/70; 296/193.09; 180/90
(58) Field of Classification Search .................... 296/70, 296/72, 193.09; 180/90
See application file for complete search history.

(56) References Cited

U.S. PATENT DOCUMENTS

| | | | |
|---|---|---|---|
| 6,755,461 B2* | 6/2004 | Seksaria et al. | 296/193.04 |
| 6,886,886 B2* | 5/2005 | Seksaria et al. | 296/193.09 |
| 6,893,065 B2* | 5/2005 | Seksaria et al. | 293/133 |
| 2003/0085592 A1* | 5/2003 | Seksaria et al. | 296/194 |
| 2009/0066116 A1* | 3/2009 | Kuroita et al. | 296/193.09 |

FOREIGN PATENT DOCUMENTS

| | | |
|---|---|---|
| JP | 09-267774 | 10/1997 |
| JP | 2003-063447 | 3/2003 |
| JP | 2004-066853 | 3/2004 |
| JP | 2007-223441 | 9/2007 |
| JP | 2009-051342 | 3/2009 |
| JP | 2009-067113 | 4/2009 |

* cited by examiner

Primary Examiner — Lori Lyjak
(74) Attorney, Agent, or Firm — Rankin, Hill & Clark LLP

(57) ABSTRACT

A structure for the front section of the vehicle body of a vehicle in which the windshield glass is curved to a large extent and the position of the front end of the hood is located below the position of the rear end thereof, the structure enabling a dust seal to be more easily applied to the areas about dashboard lower and upper sections and a windshield support. A structure for the front section of a vehicle body is provided with a joint section (62) at which a rear end flange (51) of a dashboard upper section (22) and a rear end flange (61) of a windshield support (31) are welded together by spot welding. Protrusion sections (63) which protrude rearward relative to a dashboard lower section (21) are provided to the left and right of the joint section (62). An air introduction space (64) is formed so as to open forward from the joined section (62) and so as to continuously continue in the widthwise direction of the vehicle. A brake pedal bracket (44) for supporting the brake pedal (45) is affixed to the lower surface (63a) of a protrusion section (63).

3 Claims, 6 Drawing Sheets

STRUCTURE FOR FRONT SECTION OF VEHICLE BODY

TECHNICAL FIELD

The present invention relates to a vehicle body front structure including upper and lower dashboard members separating an engine compartment and a cabin from each other.

BACKGROUND ART

A vehicle body front structure is known that has dust seal (sealer) applied to a lower dashboard member, an upper dashboard member, and a windshield support. This type of vehicle body front structure is designed with application of a dust seal taken into consideration. There is a known vehicle body front structure with a brake pedal bracket attached to both a lower dashboard member and an upper dashboard member (see, e.g., Patent Document 1).

A vehicle body front structure taught in Patent Document 1 includes a lower dashboard member (dash panel) and an upper dashboard member (cowl) separating an engine compartment and a cabin from each other. The structure further includes a brake pedal bracket fastened to both the lower dashboard member and the upper dashboard member.

As for such a structure as disclosed in Patent Document 1, however, the brake pedal bracket may be problematic in applying the dust seal to the lower dashboard member and the upper dashboard member.

For example, when the lower end of the windshield support and the upper end of the lower dashboard are coupled together sandwiching the rear end of the upper dashboard member therebetween, the dust seal (sealer) is applied after welding so as to prevent rainwater from entering the cabin.

However, the brake pedal bracket may act as an obstacle to application of the dust seal to an area defined below the brake pedal bracket. To avoid this problem, a junction where the lower dashboard member and the upper dashboard member are coupled together needs to be coated with spot seal in advance at the welding process. In other words, an additional process different other than a seal application process should be performed after the welding, which may deteriorate the productivity.

PRIOR ART LITERATURE

Patent Literature

Patent Document 1: JP-A-2004-66853

SUMMARY OF INVENTION

Technical Problem

An object of the present invention is to provide a vehicle body front structure for use in a vehicle having a largely curved windshield and a hood having a rear end and a front end located lower than the rear end, and the vehicle body front structure is designed to facilitate application of dust seal to a lower dashboard member, an upper dashboard member and a windshield support.

Solution to Problem

According to one aspect of the present invention, there is provided a vehicle body front structure comprising: upper and lower dashboard members separating an engine compartment and a cabin from each other; a windshield support disposed above the upper and lower dashboard members; a windshield supported by the windshield support; and a brake pedal bracket supporting a brake pedal, wherein the upper dashboard member has a rear end flange, the windshield support has a rear end flange spot-welded to the rear end flange of the upper dashboard member, and the rear end flange of the upper dashboard member and the rear end flange of the windshield support define a coupling area, wherein the coupling area has left and right side parts each defining a rearward projecting portion disposed rearward of the lower dashboard member, wherein an air introduction space is opening forward of the coupling area and extends continuously in a lateral direction of a vehicle body, and wherein the brake pedal bracket is secured to a lower surface of the rearward projecting portion of one of the left and right side parts of the coupling area.

Preferably, the air introduction spaced is defined by the windshield support, and the windshield support includes an upper surface, a raised portion supporting the windshield and disposed forward of the upper surface at a higher level than the upper surface, and beads extending rearward from the raised portion in a front-and-rear direction of the vehicle body.

Preferably, the lower dashboard member has an upper end flange, and the upper end flange has a center spot-welded to the coupling area and left and right side portions spot-welded to a bottom surface of the upper dashboard member, and the lower dashboard member has a flat center and flat left and right side portions.

Advantageous Effects of Invention

In the vehicle body front structure of the present invention, the coupling area is defined by the rear end flanges of the upper dashboard member and the windshield support which are spot-welded together. The left and right side parts each defining the rearward projecting portions disposed rearward of the lower dashboard member. The air introduction space is opening forward from the coupling area and extends continuously in the lateral direction of the vehicle body. The brake pedal bracket supporting the brake pedal is secured to the lower surface of the projecting portion of one of the left and left side parts of the coupling area. This arrangement of the vehicle body front structure has the advantage that the brake pedal bracket does not prohibit the application of the dust seal (sealer). Therefore, the dust seal can easily be applied to the coupling area. As a result, the application property can be improved in the lower dashboard member, the upper dashboard member, and the windshield support.

The windshield support defines the air introduction space and includes the upper surface and the raised portion supporting the windshield support and disposed forward of the upper surface at the higher level than the upper surface. The windshield support further includes the beads extending rearward from the raised portion in the front-and-rear direction of the vehicle body. This arrangement of the windshield support can help firmly support the brake pedal bracket. As a result, the support stiffness of the brake pedal can be improved.

The lower dashboard member has the upper end flange having the center spot-welded to the coupling area and the left and right side portions spot-welded to the bottom surface of the upper dashboard member. The lower dashboard member has the flat center and the flat left and right side portions. Therefore, the vehicle body stiffness can sufficiently be ensured. For example, when a significantly curved windshield is employed, the windshield can be disposed without narrowing a cabin space.

MODE FOR CARRYING OUT INVENTION

One preferred embodiment of the present invention will now be described with reference to the accompanying drawings.

Embodiment

Figure 1:
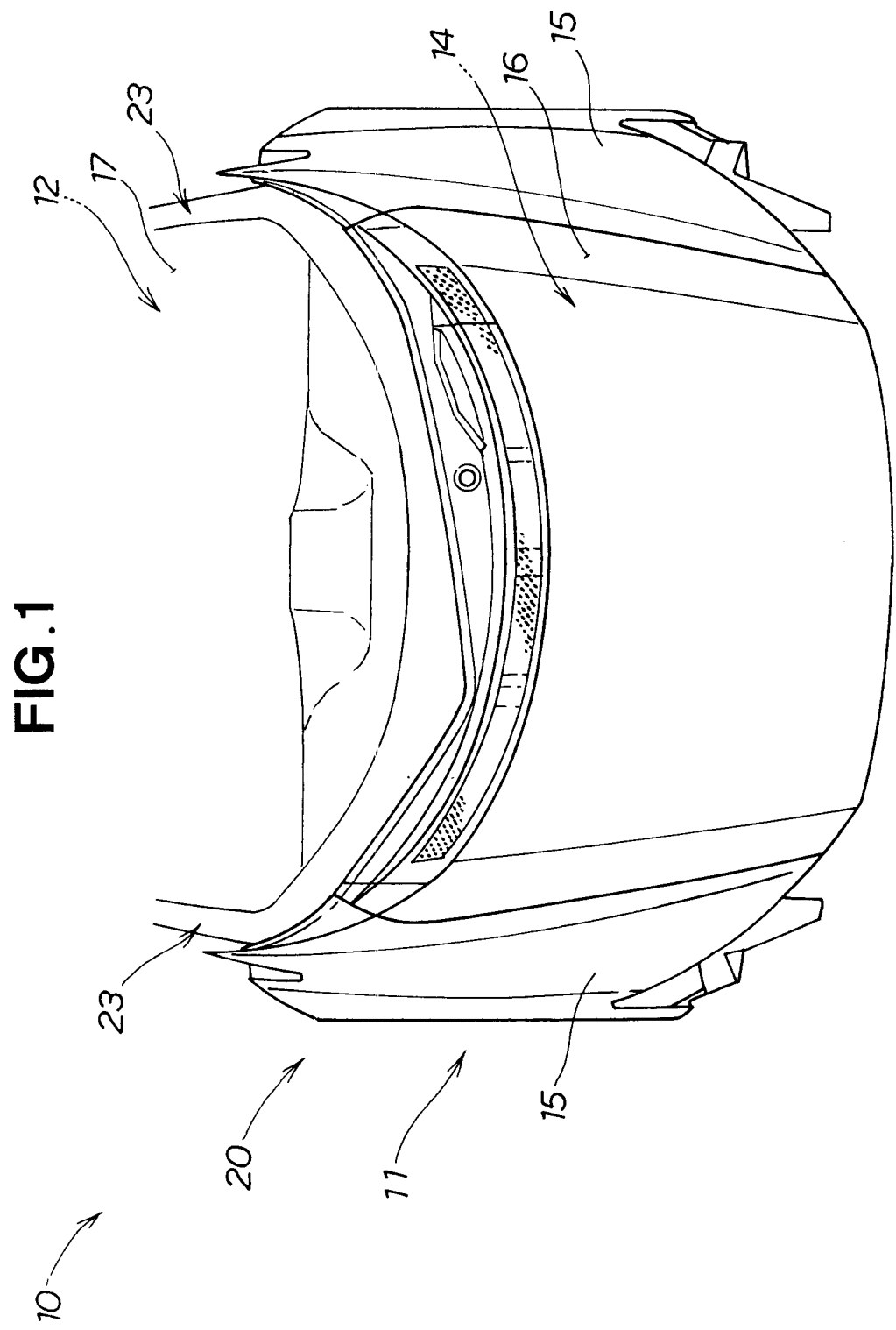
FIG. 1 is a partial plain view of a vehicle employing a vehicle body front structure according to the present invention.
Figure 2:
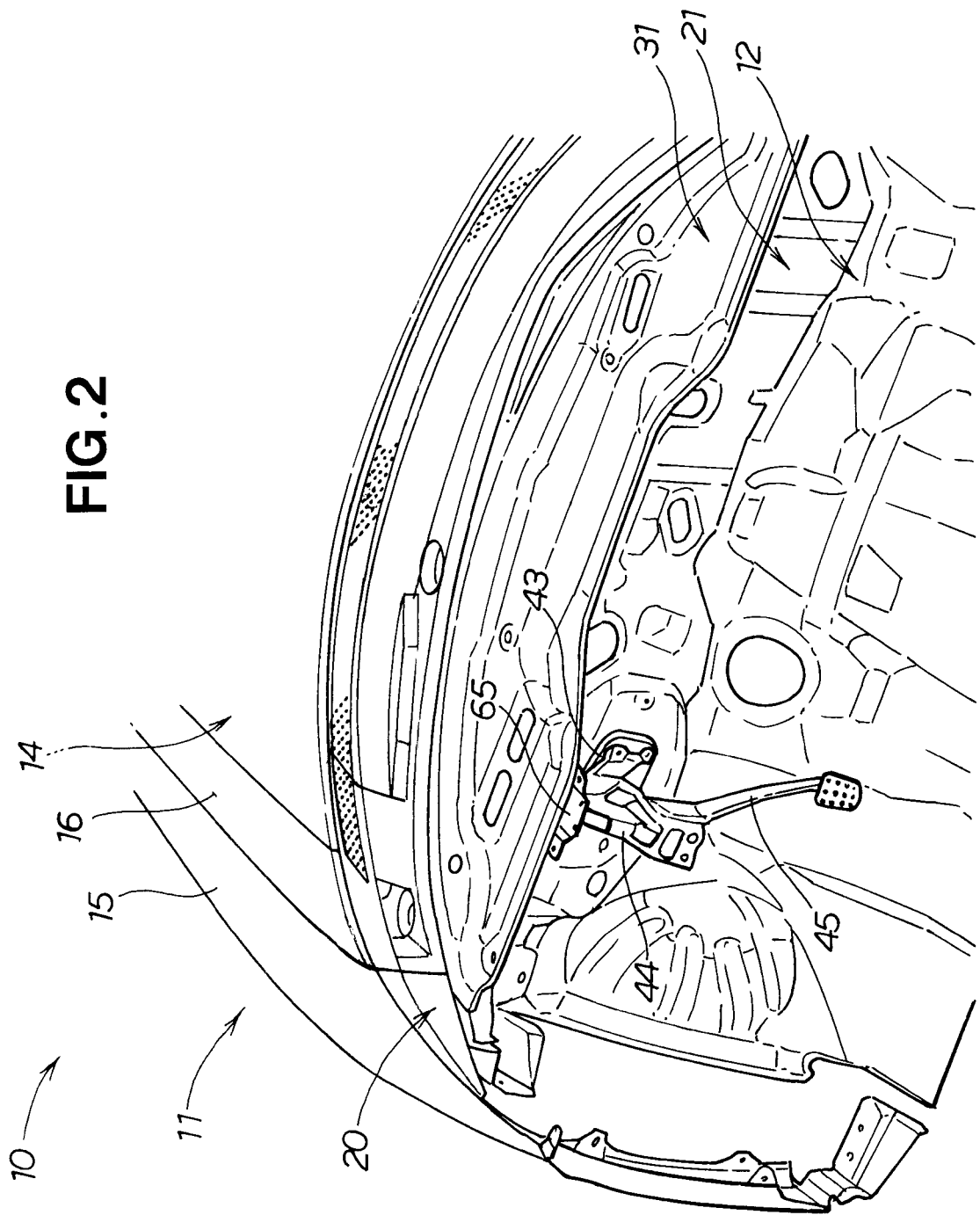
FIG. 2 is a perspective view of the vehicle body front structure from the cabin side of the vehicle depicted in FIG. 1.
Figure 3:
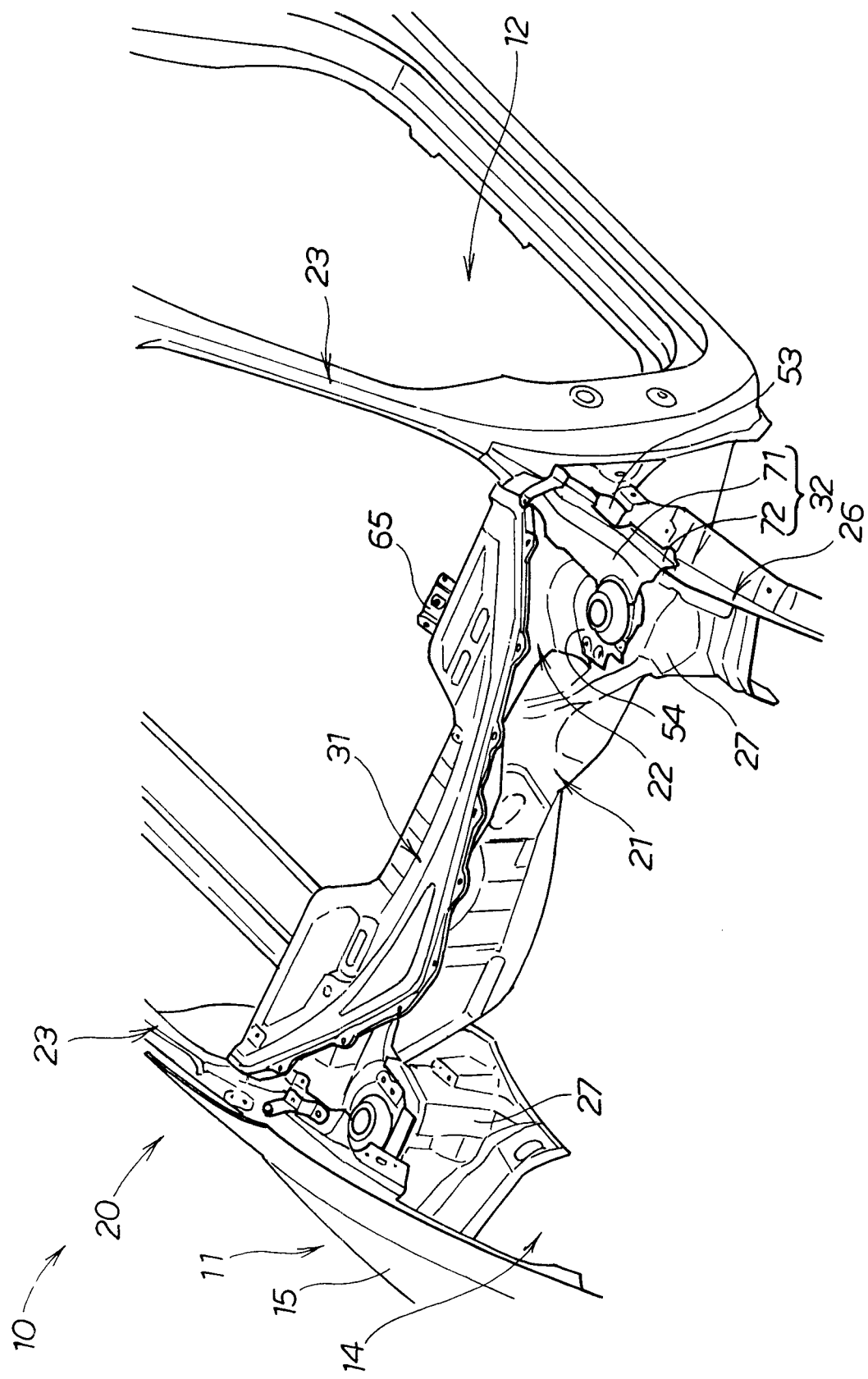
FIG. 3 is a perspective view of the vehicle body front structure depicted in FIG. 2 from the outside of the vehicle.

As depicted in FIG. 1, a vehicle 10 includes a vehicle body 11, an engine compartment 14 housing an engine (not depicted) and auxiliary machines, a cabin 12 disposed with seats (not depicted) on which passengers sit etc., left and right front fenders 15, 15 covering the sides of the engine compartment 14, a hood 16 covering the upper side of the engine compartment 14, and a windshield 17 separating the cabin 12 and the outside of the vehicle.

As depicted in FIGS. 2 to 6, a vehicle body front structure 20 includes a lower dashboard member 21 and an upper dashboard member 22 separating the engine compartment 14 and the cabin 12, front pillars 23, 23 disposed at both the left and right ends of the lower dashboard member 21 and the upper dashboard member 22, upper members 26, 26 (not depicted on one side) extending from the front pillars 23, 23 toward the front side of the vehicle, damper bases 27, 27 disposed between the upper members 26, 26 and a front side frame (not depicted), a windshield support 31 disposed on the upper side of the upper dashboard member 22 and supporting the windshield 17, and L-shaped cross-section frames 32, 32 (not depicted on one side) extending between the upper members 26, 26 and the front pillars 23, 23.

The windshield 17 is curved into a convex shape with the center portion projecting toward the front side of the vehicle, and the left and right side portions of the windshield 17 are curved to extend from the front side to the rear side of the lower dashboard member 21. The upper portion of the damper base 27 is supported by the upper member 26.

The lower dashboard member 21 includes a main body portion 41 formed substantially flat from the left and right side portions to the center, an upper end flange 42 formed on the upper end of the main body portion 41, and a bracket attaching portion 43 to which a front portion of a brake pedal bracket 44 is attached.

The upper end flange 42 is coupled at the center to a coupling area 62 of the upper dashboard member 22 and the windshield support 31 and coupled on the left and right side portions to a bottom surface 52 of the upper dashboard member 22.

Specifically, the upper end flange 42 is spot-welded at the center to the coupling area 62 and spot-welded on the left and right side portions to the bottom surface 52 of the upper dashboard member 22. In other words, the lower dashboard member 21 has the upper end flange 42 coupled at the center to both a rear end flange 51 of the upper dashboard member 22 and a rear end flange 61 of the windshield support 31 and coupled on the left and right side portions to the bottom surface 52 of the upper dashboard member 22.

The upper dashboard member 22 is and is formed to have the rear end flange 51 coupled (spot-welded) to the windshield support 31 and coupled (spot-welded) to the center of the upper end flange 42 of the lower dashboard member 21, the bottom surface 52 to which the upper end flange 42 on the left and right side portions of the lower dashboard member 21 is coupled (spot-welded), drainage channels 53, 53 (not depicted on one side) formed at the both ends to flow rainwater, and damper base coupling portions 54, 54 formed in the front portions at the both ends and coupled to the damper bases 27.

The windshield support 31 is formed to have the rear end flange 61 coupled (spot-welded) to the rear end flange 51 of the upper dashboard member 22, an raised portion 67 formed higher than an upper surface 31a on the front side of the upper surface 31a and supporting the windshield 17, and beads 68a to 68g extending backward from the raised portion 67. A plurality of the beads 68a to 68g is formed on the left and right of the windshield support 31.

In the vehicle body front structure 20, the coupling area 62 is formed by spot-welding the rear end flange 61 of the windshield support 31 and the rear end flange 51 of the upper dashboard member 22; projecting portions 63 are formed by projecting the left and right of the coupling area 62 backward relative to the lower dashboard member 21; an air passage 64 is formed opening forward in the coupling area 62 and extending continuously in the vehicle width direction; and a stay member 65 for fixing the brake pedal bracket 44 is disposed on a lower surface 63a of one of the projecting portions 63.

The lower surface 63a of the projecting portion 63 is located at the same location as the bottom surface 52 of the upper dashboard member 22.

In the vehicle body front structure 20, dust seal (sealer) 69 is applied on the left and right side portions to the coupling area 62 formed by spot-welding the rear end flange 61 of the windshield support 31 and the rear end flange 51 of the upper dashboard member 22. The coupling area 62 is spot-welded at the center to the upper end flange 42 of the lower dashboard member 21 and the dust seal 69 is applied to the coupling area 62 and the upper end flange 42 in an integrated manner. The dust seal 69 is continuously applied to the edge portions of the rear end flanges 51, 61 and the upper end flange 42.

The brake pedal bracket 44 is a member supporting a brake pedal 45 in a freely stepped manner. A front portion of the brake pedal bracket 44 is attached to the bracket attaching portion 43 of the lower dashboard member 21. A rear portion of the brake pedal bracket 44 is attached to the stay member 65.

The coupling area 62 is a portion of spot-welding of the rear end flange 51 of the upper dashboard member 22 and the rear end flange 61 of the windshield support 31. The air passage (air introduction space) 64 is formed by the upper dashboard member 22 and the windshield support 31. In other words, the upper dashboard member 22 and the windshield support 31 have the respective rear end flanges 51, 61 coupled to define the air passage 64 on the front side of the coupling area.

The L-shaped cross-section frame 32 is a member integrating a hinge base function of supporting the hood 16 (FIG. 1) freely openable and closable and an upper dashboard member side member function of reinforcing the front pillar 23 and the upper member 26.

The L-shaped cross-section frame 32 consists of an upper surface jointing portion 71 that joints an upper surface 26a of the upper member 26 and an upper surface 23a of the front pillar 23 to form a continuous flat surface, and an outer surface jointing portion 72 that joints an outer surface 26b of the upper member 26 and an outer surface 23b of the front pillar 23 to form a continuous flat surface. On the side of the damper base 27, the upper surface jointing portion 71 is also coupled via the upper dashboard member 22 to the damper base 27. On the side of the front pillar 23, the outer surface jointing portion 72 is also coupled to the upper dashboard member 22.

Figure 6:
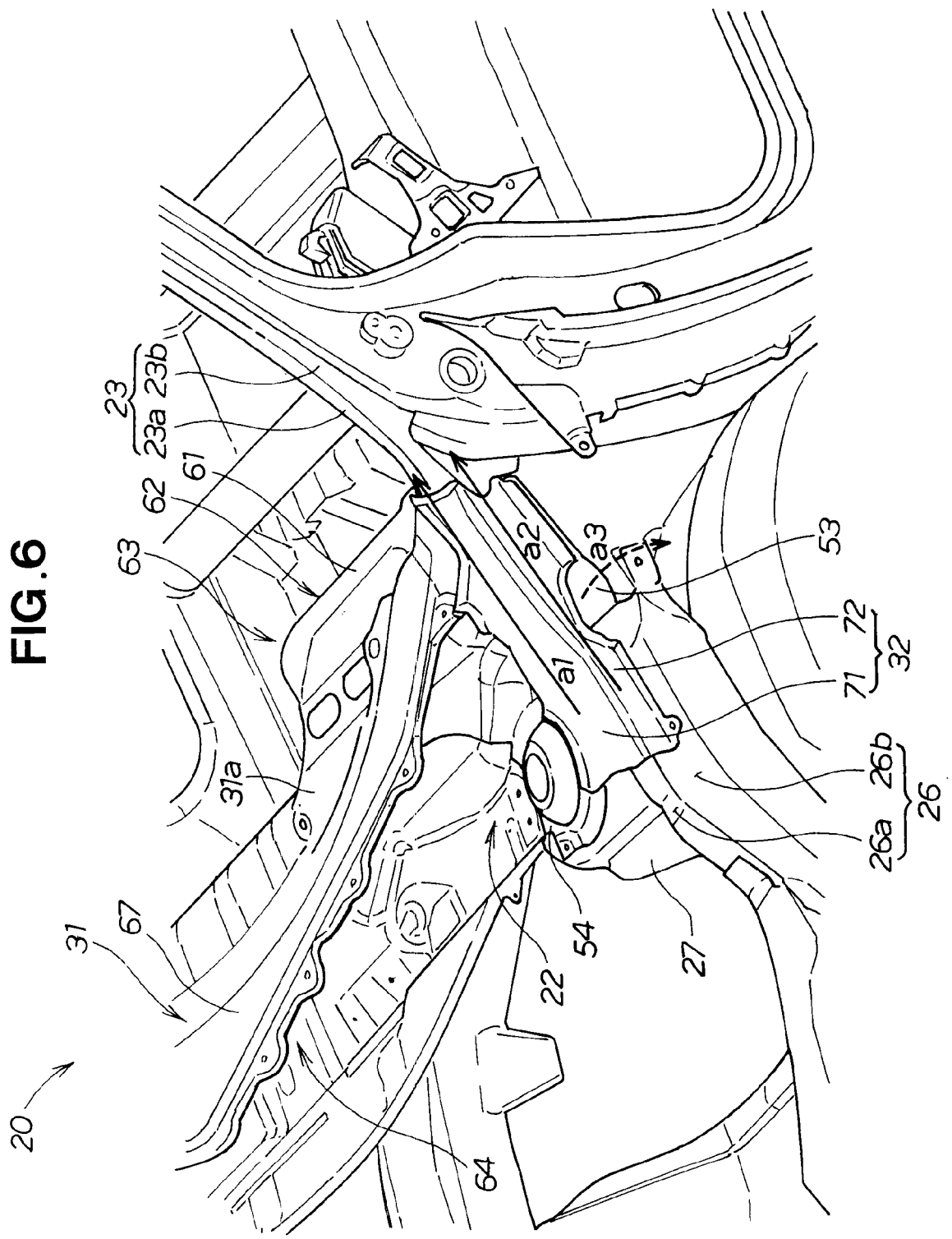
FIG. 6 is an enlarged perspective view of the periphery of an L-shaped cross-section frame of the vehicle body front structure depicted in FIG. 3.

Therefore, as depicted in FIG. 6, a load is transmissible as indicated by an arrow a1 from the upper surface 26a of the upper member 26 to the upper surface 23a of the front pillar 23. A load is transmissible as indicated by an arrow a2 from the outer surface 26b of the upper member 26 to the outer surface 23b of the front pillar 23. Therefore, the vehicle body stiffness can be improved.

The drainage channel 53 flowing rainwater is formed in the upper dashboard member 22 and, therefore, rainwater running off the windshield 17 can be drained to the outside of the vehicle as indicated by an arrow a3.

The vehicle body front structure 20 includes the lower dashboard member 21 and the upper dashboard member 22 separating the engine compartment 14 and the cabin 12, the windshield support 31 disposed on the upper side of the lower dashboard member 21 and the upper dashboard member 22, and the windshield 17 supported by the windshield support 31.

The coupling area 62 is formed by spot-welding the rear end flange 51 of the upper dashboard member 22 and the rear end flange 61 of the windshield support 31; the projecting portions 63 are formed by projecting the left and right of the coupling area 62 backward relative to the lower dashboard member 21; the air introduction space 64 is formed opening forward from the coupling area 62 and extending continuously in the vehicle width direction; the brake pedal bracket 44 supporting the brake pedal 45 is fixed via the stay member 65 to one of the lower surfaces 63a of the projecting portions 63; and, therefore, the brake pedal bracket 44 does not prohibit the application of the dust seal (sealer) 69. Therefore, the dust seal 69 can easily be applied to the coupling area 62. As a result, the application property of the dust seal 69 can be improved in the lower dashboard member 21, the upper dashboard member 22, the windshield support 31, etc.

The vehicle body front structure 20 has the raised portion 67 formed higher than the upper surface 31a and supporting the windshield 17 on the front side of the upper surface 31a of the windshield support 31 with the air introduction space 64 formed, and the beads 68a to 68g formed backward from the raised portion 67 along the vehicle longitudinal direction on the upper surface 31a of the windshield support 31 in the parts corresponding to the projecting portions 63 and, therefore, the brake pedal bracket 44 can firmly be supported. As a result, the support stiffness of the brake pedal 45 can be improved.

In the vehicle body front structure 20, since the lower dashboard member 21 has the upper end flange 42 spot-welded at the center to the coupling area 62 and spot-welded on the left and right side portions to the bottom surface 52 of the upper dashboard member 22 and the lower dashboard member 21 is formed flat from the left and right side portions to the center, the vehicle body stiffness can sufficiently be ensured. For example, when the significantly curved windshield 17 is employed, the windshield can be disposed without narrowing a cabin space.

Although the L-shaped cross-section frame 32 has the upper surface jointing portion 71 coupled on the side of the damper base 27 via the upper dashboard member 22 to the damper base 27 as depicted in FIG. 6 in the vehicle body front structure according to the present invention, this is not a limitation and the connection may directly be achieved to the damper base 27.

Figure 4:
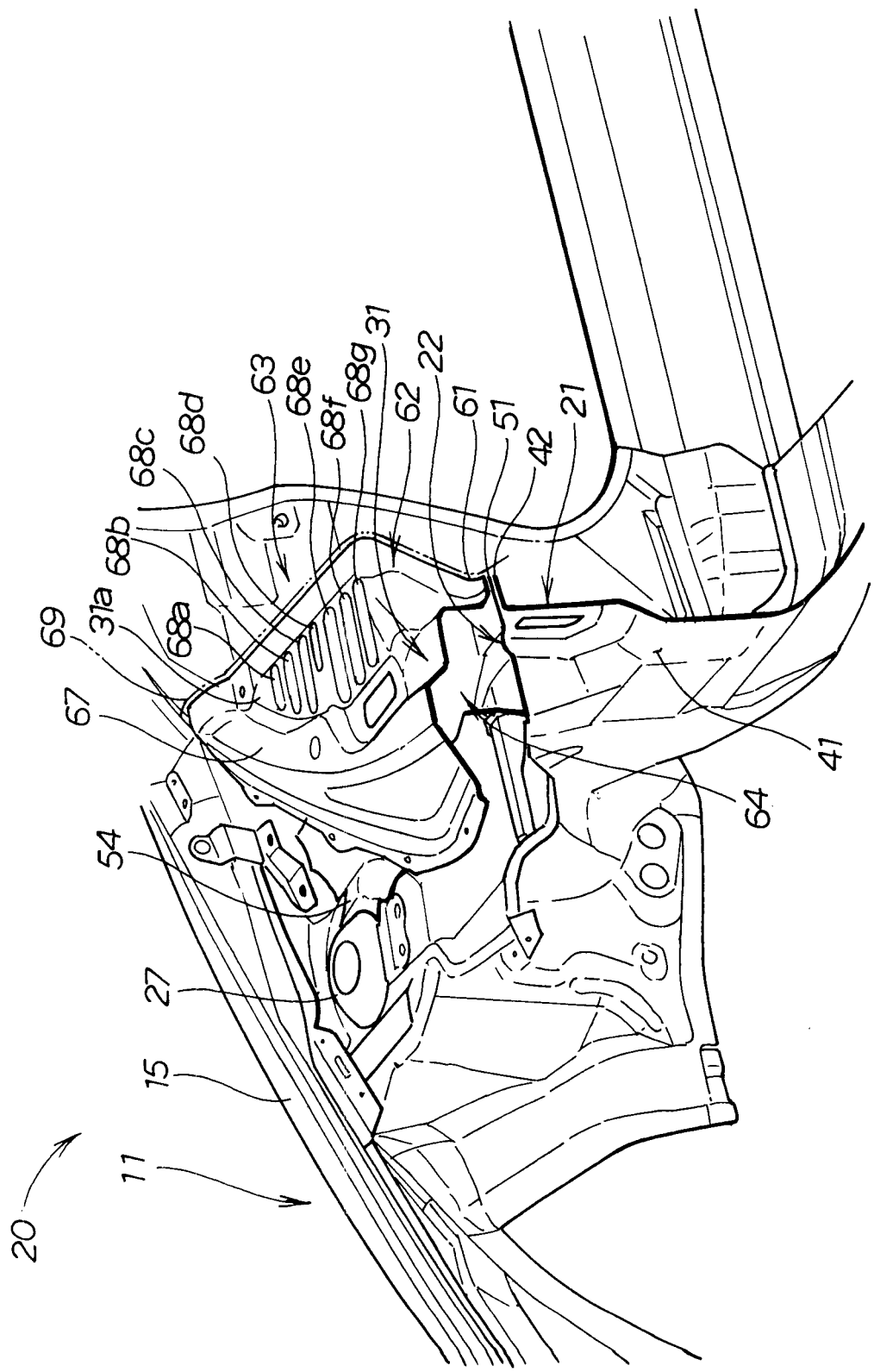
FIG. 4 is a partially cross-sectional perspective view of the vehicle body front structure depicted in FIG. 3.
Figure 5:
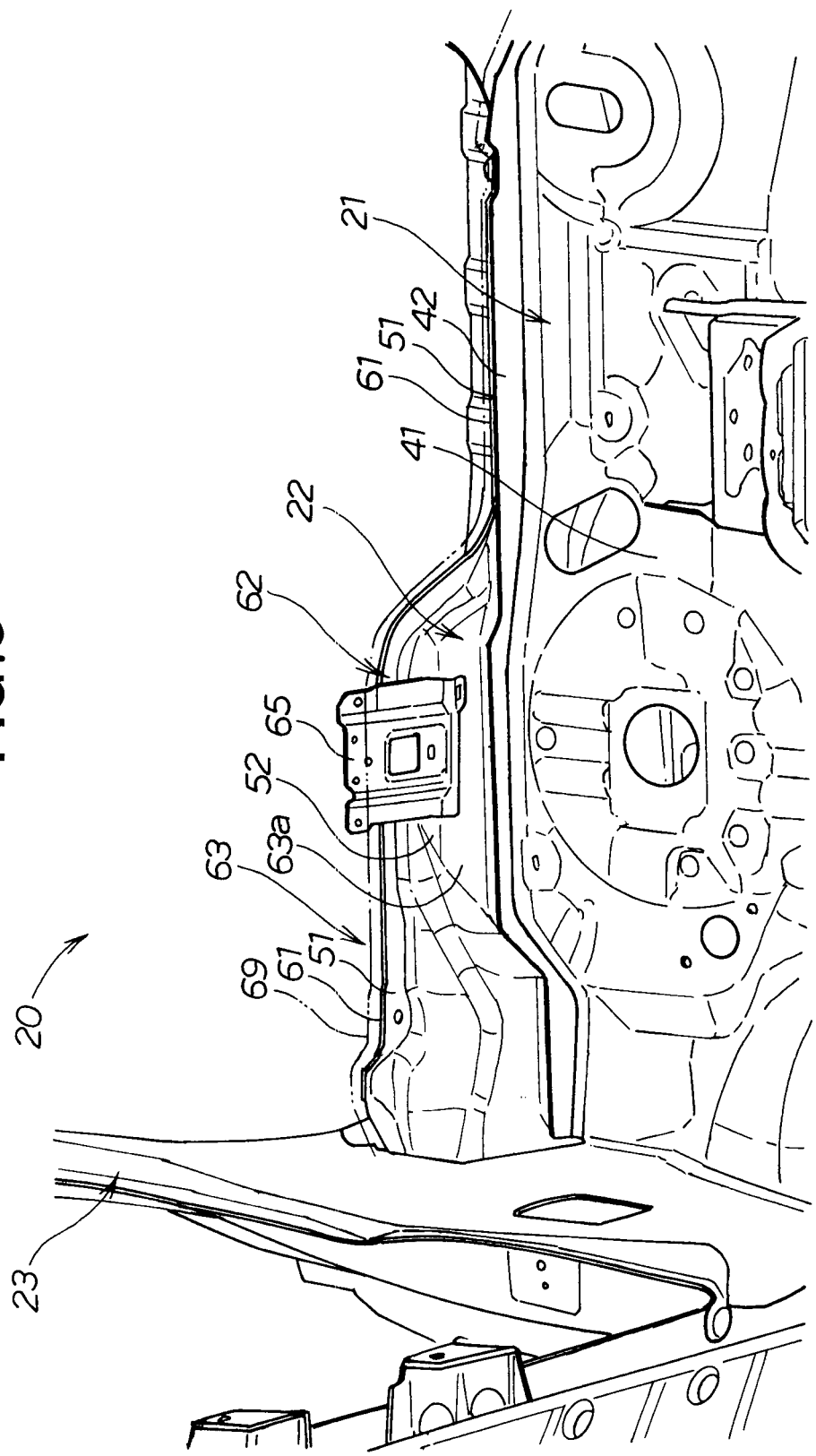
FIG. 5 is a perspective view of the vehicle body front structure depicted in FIG. 3 from the rear lower side of the vehicle body.

Although the projecting portions 63 have the beads 68a to 68g formed backward from the raised portion 67 along the vehicle longitudinal direction as depicted in FIG. 4 in the vehicle body front structure according to the present invention, this is not a limitation and the beads may be formed along the vehicle width direction. Any number of beads may be formed.

INDUSTRIAL APPLICABILITY

The vehicle body front structure according to the present invention is preferably employed for a vehicle with a windshield significantly curved and a leading end of a hood set to a lower position.

LISTING OF REFERENCE NUMERALS

10 . . . vehicle; 11 . . . vehicle body; 12 . . . cabin; 14 . . . engine compartment; 17 . . . windshield; 20 . . . vehicle body front structure; 21 . . . lower dashboard member; 22 . . . upper dashboard member; 31 . . . windshield support; 31a . . . upper surface; 42 . . . upper end flange; 44 . . . brake pedal bracket; 45 . . . brake pedal; 51 . . . rear end flange; 52 . . . bottom surface; 61 . . . rear end flange; 62 . . . coupling area; 63 . . . projecting portion; 63a . . . lower surface; 64 . . . air introduction space; 67 . . . raised portion; and 68 . . . bead.

The invention claimed is:
1. A vehicle body front structure comprising:
upper and lower dashboard members separating an engine compartment and a cabin from each other;
a windshield support disposed above the upper and lower dashboard members;
a windshield supported by the windshield support; and
a brake pedal bracket supporting a brake pedal,
wherein the upper dashboard member has a rear end flange, the windshield support has a rear end flange spot-welded to the rear end flange of the upper dashboard member, and the rear end flange of the upper dashboard member and the rear end flange of the windshield support define a coupling area,
wherein the coupling area has left and right side parts each defining a rearward projecting portion disposed rearward of the lower dashboard member,
wherein an air introduction space is opening forward of the coupling area and extends continuously in a lateral direction of a vehicle body,
wherein the brake pedal bracket is secured to a lower surface of the rearward projecting portion of one of the left and right side parts of the coupling area, and
wherein the air introduction spaced is defined by the windshield support, and the windshield support includes right and left side parts each having an upper surface, a raised portion supporting the windshield and disposed forward of the upper surface at a higher level than the upper surface, and beads extending rearward from the raised portion in a front-and-rear direction of the vehicle body.

2. The structure of claim 1, wherein the lower dashboard member has an upper end flange, and the upper end flange has a center spot-welded to the coupling area and left and right side portions spot-welded to a bottom surface of the upper dashboard member, and wherein the lower dashboard member has a flat center and flat left and right side portions.

3. The structure of claim 1, further comprising:
a dust seal applied to the coupling area at left and right sides of the structure; and
a stay member securing the lower surface of the rearward projecting portion to the brake pedal bracket therethough.

* * * * *